(12) United States Patent
Beylich et al.

(10) Patent No.: US 7,799,230 B2
(45) Date of Patent: Sep. 21, 2010

(54) METHOD FOR TREATMENT OF OIL TO FACILITATE ITS SUBSEQUENT REMOVAL

(75) Inventors: Jest Beylich, Oslo (NO); Ernil Arne Kleppe, Gursken (NO); Ferdinand Männle, Oslo (NO); Roger Hauge, Gursken (NO); Kaare Roger Rödseth, Gursken (NO)

(73) Assignee: Nor-X Industry AS, Gursken (NO)

( * ) Notice: Subject to any disclaimer, the term of this patent is extended or adjusted under 35 U.S.C. 154(b) by 643 days.

(21) Appl. No.: 11/596,362

(22) PCT Filed: May 13, 2005

(86) PCT No.: PCT/NO2005/000162

§ 371 (c)(1), (2), (4) Date: Mar. 21, 2007

(87) PCT Pub. No.: WO2005/110930

PCT Pub. Date: Nov. 24, 2005

(65) Prior Publication Data

US 2007/0241059 A1    Oct. 18, 2007

(30) Foreign Application Priority Data

May 14, 2004    (NO) .................................. 20042009

(51) Int. Cl.
C02F 1/28    (2006.01)
(52) U.S. Cl. ................ 210/693; 210/691; 210/708; 210/728; 210/729; 210/924; 210/925
(58) Field of Classification Search ................. 210/925
See application file for complete search history.

(56) References Cited

U.S. PATENT DOCUMENTS

| | | | | |
|---|---|---|---|---|
| 3,198,731 A * | 8/1965 | De Lew | ...................... | 210/774 |
| 3,755,189 A * | 8/1973 | Gilchrist et al. | ............. | 516/108 |
| 3,835,049 A * | 9/1974 | King | ......................... | 210/758 |
| 3,886,070 A * | 5/1975 | Martineau et al. | ........... | 210/705 |
| 4,039,489 A * | 8/1977 | Fletcher et al. | ................ | 521/63 |
| 4,178,265 A * | 12/1979 | Matsuda et al. | ............. | 516/103 |
| 5,262,059 A * | 11/1993 | Pohl | .......................... | 210/691 |
| 5,453,129 A * | 9/1995 | Allen et al. | ..................... | 134/4 |
| 6,177,016 B1 * | 1/2001 | Miller et al. | ................ | 210/721 |
| 6,388,043 B1 * | 5/2002 | Langer et al. | ................. | 528/80 |
| 6,849,581 B1 * | 2/2005 | Thompson et al. | .......... | 507/118 |
| 7,459,488 B2 * | 12/2008 | Donahue et al. | .............. | 521/64 |
| 2002/0185444 A1 * | 12/2002 | Coronado et al. | ........... | 210/693 |

* cited by examiner

*Primary Examiner*—Peter A Hruskoci
(74) *Attorney, Agent, or Firm*—Dennison, Schultz & MacDonald

(57) ABSTRACT

Method for treatment of oil on a solid or liquid surface to facilitate subsequent removal of the oil from the surface. A fat-soluble metal containing substance comprising an organic anion and a metallic cation is added to the oil. The metal containing substance may be prepared by allowing a metal salt to react with an acidic organic compound in a process in which a suitable oxidation agent ensures that all the metal in the end product is present at its highest stable oxidation state while at least one volatile compound is formed during the preparation. A polymeric material with a high specific surface area may optionally be added or a prepolymer for allowing subsequent formation of such a polymeric material.

30 Claims, 3 Drawing Sheets

METHOD FOR TREATMENT OF OIL TO FACILITATE ITS SUBSEQUENT REMOVAL

Figure 1:
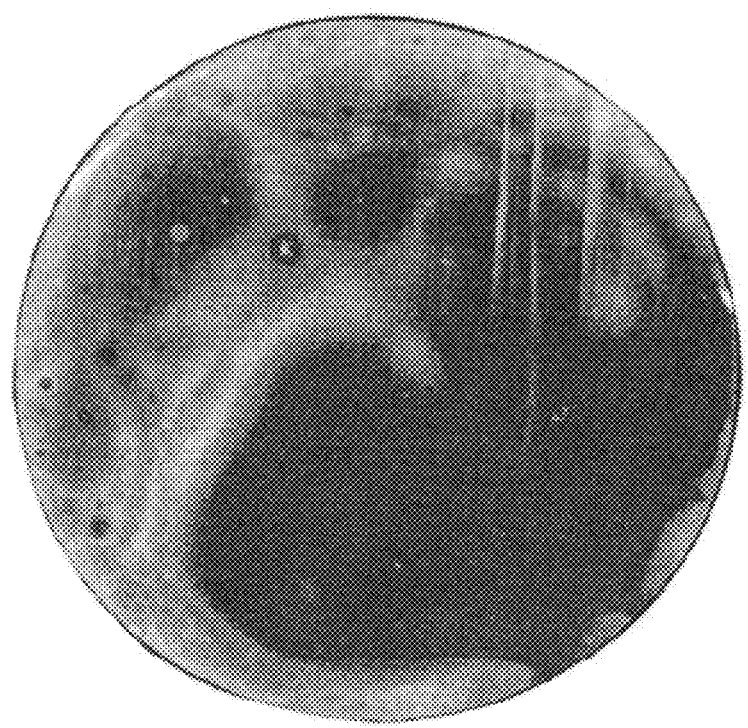

This application is a 371 of PCT/NO2005/000162 filed on May 13, 2005.

The present invention concerns a method of treating of oil spill by adding to the oil a fat-soluble metal containing substance that leads to a contraction of the oil spill if present on an aqueous surface while exhibiting good affinity to e.g. a polymeric material.

BACKGROUND

Oil spill is a global problem related to the vast amounts of oil that are produced off shore as well as the large amounts of oil being transported on ships independent of the site of production.

There have been made many attempts to solve the problem related to such pollution irrespective of their origin are loss during production, uncontrolled blow outs, leakages from ships during transportation or in case of shipwrecking by natural courses or as a consequence of actions of war or terror.

Many good attempts have been made but since the problem is huge and multifarious the final solution that ends the problem once and for all will probably never be found. The largest problems encountered recently are large and concentrated oil spills close to a coast line, in case of shipwrecking or the like, where several tons of oil is lost as a whole, often in bad weather conditions, causing very severe damage to the life in the sea as well as along the coastline. It is a major challenge to provide better ways to handle also these kinds of spills.

Measures that have been proposed includes methods of chemical as well as of physical/mechanical treatment of oil spill and commonly a combination of chemical and physical/mechanical treatment. With respect to the chemical methods of treatment these may broadly be split in two categories. One category involves dispersion of the oil so that it will sink and be degraded in the water as separate droplets (U.S. Pat. No. 5,618,468 and U.S. Pat. No. 6,194,473). Methods belonging to this category are best suited for spills far from the shore where there are significant depths of water available for the oil to be dispersed in. A chemical method for treatment of oil spill that is based on the opposite principle, may be designated stiffening of the oil, which means that chemicals are added to ensure that the oil does not become dispersed but remains as a whole and more or less solid and thereby may be more easily removed by mechanical means in a next step. With "mechanical means" herein is understood a treatment with oil weirs, pumps, drawworks, excavating and lifting mechanisms of any kind that may be used to transport the oil from a water surface into any kind of container for recovery or destruction. With "physical treatment" herein is understood addition of substances that has an effect on the oil without causing a chemical reaction, such as absorbents or the like in which the oil may be absorbed.

Polymers may be used to make oil stiffen or solidify. U.S. Pat. No. 5,453,129 teaches in situ fibre spinning of a polymer web on top of an oil spill and subsequent collection of the polymer/oil combination. A comprehensive overview of chemicals and mixtures used for stiffening of oil spills is published in "The effectiveness of solidifiers for combatting oil spills", Ali Ghalambor, University of Southwestern Louisiana, USA, Technical Report Series 96-006. Common for most of these chemicals and mixtures is that they are applied as a solid substance with a requirement of at least 1 kg of chemical or mixture per 3 kg of oil.

The manner of operation for some of the chemicals and mixtures involve a chemical reaction. One example is use of solutions of adhesives that are dried in presence of common catalysts such as cobalt naphtenate (U.S. Pat. No. 3,755,189). Usually the catalyst is mixed into the adhesive solution but it may also be added directly to the oil spill before or after adding the adhesive solution. The advantage of this method is that the adhesive solution has a longer shelf life and therefore may be stored for a longer period of time after being manufactured. A typical composition from U.S. Pat. No. 3,755,189 comprises 65-85% of a suitable solvent, 2-6% cobalt naphtenate while the adhesive constitutes the remaining ad 100%. The added composition leads to the formation of a film on top of the oil spill and subsequent confinement of the oil. The disadvantage is the use of large quantities of solvents that firstly are highly flammable when being applied and that secondly dilute the oil and thereby delay the confinement.

A frequently used way of stiffening and removing or confining of oil spill is based on use of materials with a high surface area/weigh ratio which in addition may be surface modified by certain chemicals and/or reaction mixtures (U.S. Pat. No. 4,780,518; U.S. Pat. No. 5,961,823; DE 28 45 975).

OBJECTS

It is thus an object of the present invention to provide a method and/or a means to quickly render harmless oil that is lost as a whole in large amounts on a water surface as well as on other liquid or solid surfaces.

It is hereunder an object to provide a means to ensure that oil spill on a water surface and on other liquid or solid surfaces remain as a whole for a period of time sufficient to ensure that the oil may be removed from the surface with mechanical means with or without additional treatment.

THE INVENTION

The above mentioned objects are achieved by the method according to the present invention.

Preferred embodiments of the invention are disclosed by the dependent claims.

The invention concerns a method for treatment of oil on a solid or liquid surface in order to facilitate subsequent removal of the oil from the surface, involving addition of a fat-soluble metal containing substance comprising a metal complex comprised by an organic fat-soluble anion and a metal cation. The organic anion may be a remainder from a fatty acid or fatty acid derivative or an anion of a sulfonic acid, sulfinic acid, phosphonic acid, or phosphinic acid, or a derivative of such acids, or an anion of a β-dicarbonyl compound. The metallic cation can be a cation chosen from the transition metals in the periodic table of the elements or a cation chosen among the lanthanides or chosen among alkali metals or alkaline earth metals or chosen among aluminium, boron, or gallium. Examples of such fat-soluble metal containing substances are:

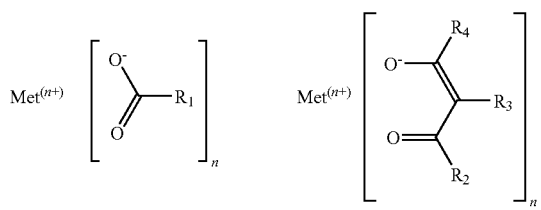

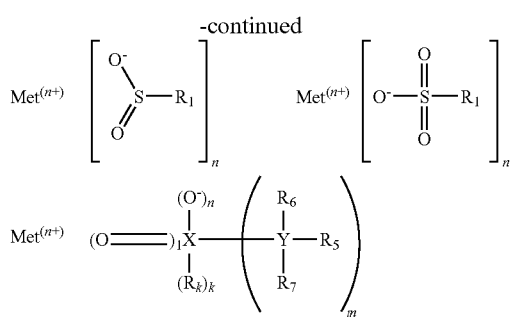

where Met$^{(n+)}$ represents a metallic or semi metallic cation, such as Li, Be, B, Na, Mg, Al, K, Ca, Sc, Ti, V, Cr, Mn, Fe, Co, Ni, Cu, Zn, Ga, Ge, As, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Ti, Pb, Bi and k, l, n, m are integers chosen among 0, 1, 2, 3, 4 and X, Y are chosen among O, N, C, B, S, P and Se. $R_1$-$R_7$ are chosen among hydrogen, unsubstituted saturated or unsaturated $C_1$-$C_{24}$-alkyl, substituted saturated or unsaturated $C_1$-$C_{24}$-alkyl, substituted or unsubstituted aryl, in which the carbon chains of said compounds may optionally include one or more of the elements oxygen, nitrogen, sulphur, phosphorous, silicon, and boron; and groups which are chosen among condensation products or addition products of one or more types of chemical compounds such as acids, alcohols, phenols, amines, aldehydes or epoxides.

The composition of the fat soluble metal containing substance is preferably chosen in a way that it is present as a liquid at 25° C. Under any circumstance it is preferred that the fat-soluble metal containing substance is present as a liquid or in the form of a solution when it is added to the oil to be treated, since this significantly simplifies its application. It is furthermore preferred that the chain length of the organic anion is in the range $C_3$-$C_{10}$. In addition it is advantageous if the metallic cation is present in its highest stable oxidation state at 25° C., 1 bar and maximum 98% relative humidity. In the case of iron substances this means that the metal ions mainly are ferric $Fe^{3+}$ ions. The fat-soluble metal containing substance is normally added to the oil in an amount that gives a weight ratio oil:metal containing substance in the range 3:1 to 100:1 and more preferred in the range 5:1 to 20:1. The ratio between oil and the fat-soluble substance is thus lower than what is normal for most commonly used additives for similar purpose, which contributes positively to moderate the costs of the present method.

The volatile compound will be a reaction product from the reaction between the metal salt and the acidic organic compound or a reaction product that is formed in connection with use of the oxidizing agent.

By an optional, additional feature the present invention utilizes the affinity between a suitable material such as a polymeric material and oil to further simplify subsequent recovery of the oil spill. A polymeric material with a high specific surface, typically at least 10 m²/kg, is well suited for stiffening (confinement) and subsequent recovery of the oil spill. It is particularly advantageous that the polymeric material contain polar groups. Such polar groups can be chosen among hydroxyl groups, ether groups, ester groups, amine groups, amide groups, amidine groups, carbonyl groups, and carboxyl groups. Polymeric materials that contain such groups are e.g. polyesters such as polyethylene terephthalate, polyamides, polyethers, polyacrylates, cellulose, and starch derivatives. The polymeric material can generally be chosen among polymer fibres, polymer foams and/or the polymeric material may include a porous additive. In addition the polymeric material has form of polymer fibres that are spun to or have been spun to a polymer web.

Furthermore and in accordance with an alternative further feature of the invention, a polymeric material in the form of a film forming polymer composition comprising a prepolymer and up to 20% by weight of an organic solvent for the prepolymer may be added, wherein the polymeric material facilitated by the added fat-soluble metal containing substance leads to the formation of a film on the surface of the oil spill and/or to a stiffening of the oil spill. The prepolymer can be chosen from dendrimers, dendritic polymers, hyperbranched polymers and/or sol-gel products. A particular advantage of the sol-gel products is that these at temperatures ≦90° C. are low viscous liquids without the aid of organic solvents and therefore may be applied directly to an oil spill. Sol-gel products are inexpensive in production in addition to exhibiting important properties such as viscosity, density, while the number and reactivity of the branches may be adapted in the manufacturing process.

The major difference between the present invention and the methods and products of the prior art are described below. The present method renders it possible to confine, stiffen and remove oil spill of a magnitude from a few square meters up to several square kilometers in a cost efficient manner. Both the fat-soluble metal containing substance and suitable polymer products are inexpensive in manufacture. Compared to previously known products and methods for stiffening of oil a comparatively small quantity of substance is required in relation to the amount of oil. The material is subsequently retrieved and does not pollute the nature. Small remains of the metal containing substance and/or polymeric material is quickly degraded and not accumulated in the environment. Both the fat-soluble metal containing substance and the optionally used, suitable polymer products may be based on natural and/or recycled raw materials. In contradiction to previously known methods where film forming adhesives are applied together with metal based curing catalysts, no or only limited amounts of solvents or diluents are required when the fat-soluble metal containing substance and the film forming polymer are applied to the oil spill. If desired the fat-soluble metal containing substance for application to the oil in question can, prior to its application, be dispersed in an aqueous medium such as fresh water or salt water, optionally also including minor amounts of a suitable dispersing agent.

The fat soluble metal containing substance that is used for the method in accordance with the first aspect of the invention may vary but liquid ferric carboxylates such as iron(III)-2-ethylhexanoate, is found to be a very well suited fat soluble metal containing substance. The manufacture of such ferric carboxylates is preferably conducted with the use of a suitable oxidation agent such as air, hydrogen peroxide or organic peroxides to ensure that the iron ions are present mainly as ferric ions.

When selected transition state metals or selected metals among the lanthanides is used, a subsequent oxidative degradation is achieved e.g. on a seashore after which the contaminants are dissolved by sunlight, rain and possibly splashes of salt seawater.

When polymeric materials with a high specific surface is used, it is preferred to use polymer fibre products based on polyesters such as polyethylene terephthalate (PET) or polyamides. It is furthermore convenient that such polymeric fibre products are based on renewable raw materials or recycled raw materials.

If polymeric materials based on prepolymer are used, it is furthermore preferred to use sol-gel products based on 3-aminopropyltriethoxysilane which after hydrolysis and condensation is reacted further with mono epoxides such as glycidylethers of aliphatic alcohols and/or glycidyl acrylates.

When using the present method for an oil spill present on a water surface it does not matter weather the water is salt water or fresh water. The presence of salt in the water is neither a requirement nor an obstacle for the method according to the invention.

The method according to the invention may be used for many different situations and environments such as in cases in which the liquid surface consists of several layers or in which the oil and the liquid surface is present as a heterogeneous mixture, such as in emulsions and dispersions. Furthermore the invention may be used for the removal of oil spill from a water surface or a seashore but also e.g. as a step in a process for the production of oil. In the latter case the oil and a liquid surface may have the form of an emulsion or dispersion as mentioned above, which at least partially is comprised by process water from oil production.

The drawings on FIGS. 1 to 5 illustrate the examples 2 and 3 below.

EXAMPLES

1. Synthesis of Fat-Soluble Metal (and Iron) Containing Additive

The synthesis is conducted in a heatable 5 liter glass reactor with two charging hoppers, a mechanically powered glass stirrer, a glass mantled thermometer, a distillation cooler, an adjustable air inlet and a drain valve. 1.038 kg (7.20 moles) of 2-ethylhexanoic acid and 300 ml low-aromatic white spirit (hydrocarbon mixture, Statoil ASA) was charged to the reactor. The air inlet was adjusted to about 200 ml air per minute and the temperature adjusted to 160° C. 0.540 kg (2.00 moles) of ferric chloride hexahydrate was dissolved in a mixture of 1512 ml water and 15.1 ml hydrochloric acid (37% v/v). 30.2 grams 1% hydrogen peroxide is added slowly to the solution and filtered through a paper filter. Through one of the charging hoppers the filtered, aqueous ferric chloride solution is added at a rate of 20 ml per minutes to 2-ethylhexanoic acid. The addition of aqueous ferric chloride solution was adjusted to an amount corresponding to the amount of distilled water and hydrochloric acid. Continuous addition of air and addition of a 2 ml per minute of a 1% aqueous hydrogen peroxide solution from the other charging hopper ensured that the oxidation state III of the ferric ions was maintained. After completed addition of aqueous ferric chloride solution the mixture was boiled and distilled under continuous addition of a 5 ml per minute of a 1% hydrogen peroxide solution until the distinct yellow colour of an aqueous ferric chloride solution no longer could be observed. Then the product was drained through the bottom valve under agitation into a 10 liter 1% aqueous hydrogen peroxide solution. When the subsequent gas development diminished, the fat-soluble iron product was separated from the aqueous phase by means of a separating funnel.

2 Fat Soluble Metal Containing Additive Added to Raw Oil on a Water Surface.

Figure 2:
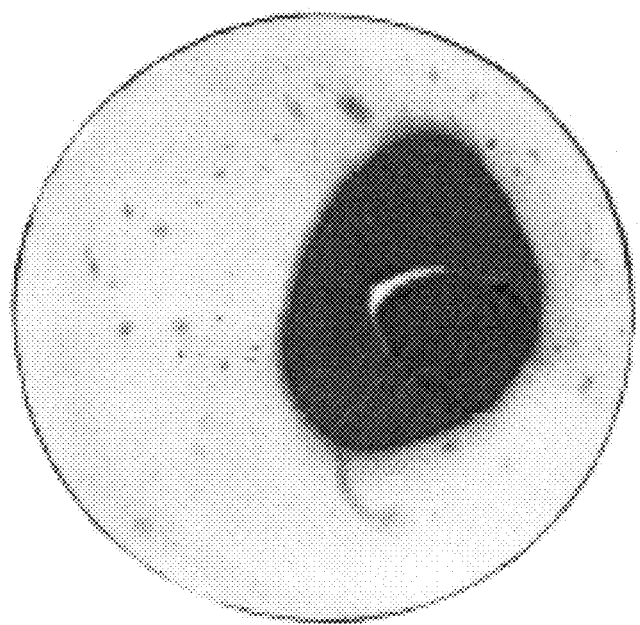

19.5 g of water was placed in a round glass dish with a diameter of 100 mm and a height of 11 mm. On top of the water surface 460 mg raw oil (from Statoil's Mongstad refinery, typical viscosity 500 cP at 20° C.) was added. The resulting oil spill is shown in FIG. 1. Then 40 mg of the product of Experiment 1 was added, whereupon the oil contracts significantly as shown in FIG. 2.

3. Raw Oil to which a Fat Soluble Metal Containing Additive has been Added is Added to Polymer Fibres.

Figure 3:
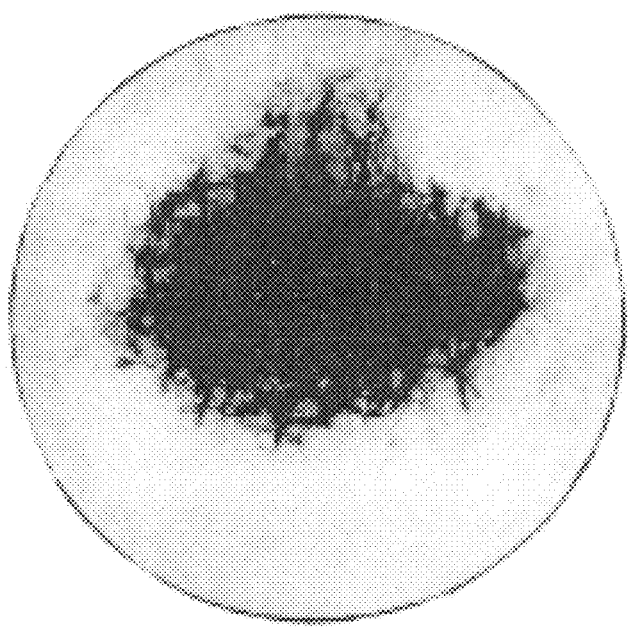
Figure 4:
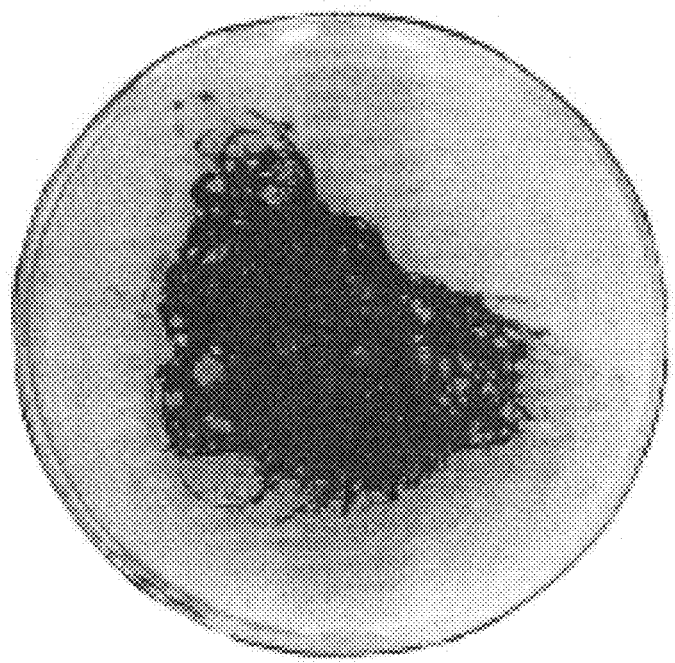
Figure 5:
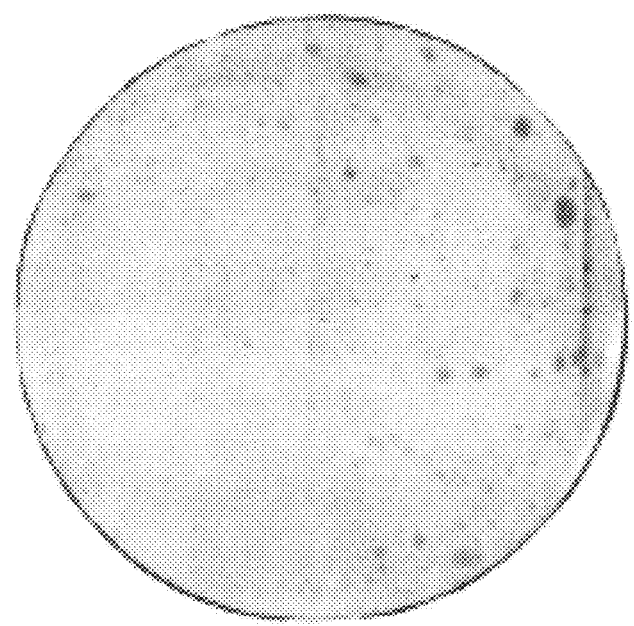

17 mg of polyethylene terephthalate (PET, typical fibre diameter 28 μm, typical surface/weight ratio 50 $m^2$/kg) were added to the contracted oil spill of Experiment 2. The oil spill quickly attracts the PET fibres as shown in FIG. 3. The oil spill has thereby been immobilized and gelled and can easily be removed from the water surface as shown in FIG. 4. Typically 95% of the total oil spill and close to 100% of the viscous, dark components of the original oil spill was removed as shown in FIG. 5. The resulting minor amounts of light, volatile components of the original oil spill may quantitatively be removed by a further addition of 17 mg of PET fibres and subsequent removal of the fibres.

4. Manufacture of a Sol-Gel Product Based on 3-aminopropyltriethoxysilane 221.4 g (1.00 mole) 3-aminopropyltriethoxysilane (A-1100, Crompton Corporation (GE, Plastics) USA) was placed in a 1000 ml round bottom flask with hose cooler and magnetic stirrer. A mixture of 93.6 g (0.60 moles) of butyldiglycol (BDG) and 22.5 g (1.30 moles) of water and 1.00 g Tinuvin 123 (Ciba Specialty Chemicals, Switzerland) was added. The mixture was heated in an oil bath at 110° C. under reflux for 45 minutes. Thereafter the volatile reaction products or reactants were removed in a vacuum distillation at an oil bath temperature of 110-160° C., and a vacuum gradient from about 1000 mbar to less than 20 mbar. The distillation was terminated when the pressure in the round bottom flask had reached 20 mbar or less for 10 minutes. About 192 ml of distillate was recovered. The reaction product has a clear, colourless liquid with a Gardner Color=1 (according to Gardner Color Scale/ASTM D1544). The reaction product was heated to 50° C. Then a mixture consisting of 256.4 g (1.00 moles) Araldite DY-E (glycidylether of C12-C14-alcohol, Vantico AG (Huntsman AG, Switzerland), 128 g (0.90 moles) gycidyl methacrylate ("metakrylsyre glycidylester") (Aldrich Chemicals AS, Norge) and 0.22 g hydroquinone monomethylether (Aldrich Chemicals AS, Norge) was added and the reaction mixture was held at 50° C. for 45 minutes. A clear product with a Gardner Color=1, in the form of a viscous gel at 20 C and comparatively low viscous at 60° C., was obtained.

5 Fat Soluble Metal Containing Additive Added to Raw Oil on a Glass Surface 3.51 g of raw oil (Shell Raffinaderi AB, Gothenburg, typical viscosity 30 cP at 20° C.) was placed in a glass dish with a diameter of 80 mm and a height of 45 mm to produce a typical oil spill on a glass surface. 430 mg of the product from Experiment 1 was added. The fat soluble metal containing substance was easily mixed with the oil spill.

6. Raw Oil from Experiment 5 with Fat-Soluble Metal Containing Substance was Added to the Sol-Gel Product from Experiment 4

690 mg of the sol-gel product from Experiment 4 was added to the oil spill on a glass surface according to Experiment 5. The glass dish with oil spill is held at 40° C. for 48 hours. The gelled oil spill is easily removable from the glass surface with ordinary "handtowel" paper (KATRIN® Industrial Cleaning Towel, Metsä, Sweden)

The invention claimed is:

1. A method for treatment of oil on a solid or liquid surface to facilitate subsequent removal of the oil from said surface, comprising the steps of
    adding to the oil a fat-soluble metal containing substance comprising a metal complex comprising an organic anion and a metallic cation that is prepared by allowing a metal salt to react with an acidic organic compound in a process in which an oxidation agent is used to ensure that all the metal in the end product is present in its highest stable oxidation state and in which at least one volatile compound is formed; and
    adding to the oil a polymeric material with a high specific surface area, wherein the polymeric material has an affinity for the oil and a specific surface area of at least 10 $m^2$/kg, to confine and stiffen the oil.

2. A method according to claim 1, wherein the organic anion is a remainder of a fatty acid or a derivative thereof.

3. A method according to claim 1, wherein the organic anion is an anion of a sulfonic acid or a sulfinic acid or a derivative of such an acid.

4. A method according to claim 1, wherein organic anion is an anion of a phosphonic acid or phosphinic acid or a derivative of such an acid.

5. A method according to claim 1, wherein the organic anion is an anion of a β-dicarbonyl compound.

6. A method according to claim 1, wherein the chain length of the organic anion is in the range $C_3$-$C_{10}$.

7. A method according to claim 1, wherein the metallic cation is a cation chosen among the transition metals in the periodic table of the elements.

8. A method according to claim 1, wherein the metallic cation is a cation chosen among the lanthanides.

9. A method according to claim 1, wherein the metallic cation is a cation chosen among the alkali metals or the alkaline earth metals.

10. A method according to claim 1, wherein the metallic cation is a cation chosen among aluminium, boron and gallium.

11. A method according to claim 1, wherein the fat-soluble metal containing substance is added with the metallic cation at its highest stable oxidation state.

12. A method according to claim 1, wherein the fat-soluble metal containing substance is prepared by allowing a metal salt to react with an acidic organic compound in a process together with an inorganic oxidation agent.

13. A method according to claim 1, wherein the fat-soluble metal containing substance is added in liquid form or in the form of a liquid solution.

14. A method according to claim 1, wherein the fat-soluble metal containing substance is added with a solvent that is present is an amount in the range 0-100% by weight of the fat-soluble metal containing substance.

15. A method according to claim 1, wherein the fat-soluble metal containing substance is added without a solvent.

16. A method according to claim 1, wherein the fat-soluble metal containing substance is added to the oil in an amount that gives a weight ratio between oil and fat-soluble metal containing substance in the range 3:1 to 100:1.

17. A method according to claim 1, wherein the fat-soluble metal containing substance is added to the oil in an amount that gives a weight ratio between oil and fat-soluble metal containing substance in the range 5:1 to 20:1.

18. A method according to claim 1, wherein the polymeric material contains polar groups chosen among hydroxyl groups, ether groups, ester groups, amine groups, amidine groups, carbonyl groups, and carboxyl groups.

19. A method according to claim 1, wherein the polymeric material has an outer shape chosen among polymeric fibres, polymeric foam and polymeric material containing a porous additive.

20. A method according to claim 1, wherein the polymeric material has the form of polymeric fibres that is spun to or have been spun to a polymeric web.

21. A method according to claim 1, wherein the polymeric material is added in the form of a film forming polymeric mixture containing a prepolymer and up to 20% by weight of an organic solvent for the prepolymer.

22. A method according to claim 21, wherein the prepolymer is chosen among dendrimers, dendritic polymers, and hyperbranched polymers.

23. A method according to claim 21, wherein the prepolymer is based on a sol-gel product.

24. A method according to claim 1, wherein the fat-soluble metal containing substance is a substance with a formula:

$$Met^{(n+)} \left( (O=)_l X \begin{matrix} (O^-)_n \\ | \\ | \\ (R_k)_k \end{matrix} \left( \begin{matrix} R_6 \\ | \\ -Y-R_5 \\ | \\ R_7 \end{matrix} \right) \right)_m$$

where $Met^{(n+)}$ represents a metallic or semi-metallic cation chosen among Li, Be, B, Na, Mg, Al, K, Ca, Sc, Ti, V, Cr, Mn, Fe, Co, Ni, Cu, Zn, Ga, Ge, As, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and Bi, and k, l, n, m are integers chosen among 0, 1, 2, 3, 4 and X, Y are chosen among O, N, C, B, S, P and Se and $R_1$-$R_7$ are chosen among hydrogen, unsubstituted, saturated or unsaturated $C_1$-$C_{24}$-alkyl, substituted saturated or unsaturated $C_1$-$C_{24}$-alkyl, substituted or unsubstituted aryl, while the carbon chains of said compounds may optionally include one or more of the elements oxygen, nitrogen, sulphur, phosphorous, silicon, and boron, and groups that are chosen among condensation products or addition products of one or more types of chemical compounds.

25. A method according to claim 24, wherein the one or more types of chemical compounds are acids, alcohols, phenols, amines, aldehydes, or epoxides.

26. A method according to claim 1, wherein the fat-soluble metal containing substance is chosen among ferric carboxylates that are liquid at standard conditions (25° C., 1 bar).

27. A method according to claim 1, wherein the oil and the liquid surface is present in several layers.

28. A method according to claim 1, wherein the oil and the liquid surface is present in an emulsion or dispersion.

29. A method according to claim 28, wherein the emulsion or dispersion at least partially is comprised by process water from oil production.

30. A method according to claim 1, wherein the method is a link in an oil production process.

* * * * *